United States Patent [19]

Rushanan et al.

[11] Patent Number: 4,903,783

[45] Date of Patent: Feb. 27, 1990

[54] SOLENOID CONTROLLED AIR TOOL

[75] Inventors: Joseph Rushanan, Bedford; James Steverding, Mentor, both of Ohio

[73] Assignee: The Stanley Works, New Britain, Conn.

[21] Appl. No.: 896,596

[22] Filed: Aug. 14, 1986

[51] Int. Cl.[4] .................... B23Q 5/00

[52] U.S. Cl. .................... 173/12; 173/2

[58] Field of Search .................... 173/2, 12, 11, 163

[56] References Cited

U.S. PATENT DOCUMENTS

| | | | |
|---|---|---|---|
| 3,983,947 | 10/1976 | Wills et al. . | |
| 4,492,146 | 1/1985 | Workman | 173/12 |
| 4,535,850 | 8/1985 | Alexander | 173/12 |
| 4,576,270 | 3/1986 | Baltz et al. | 173/12 |
| 4,721,166 | 1/1988 | Clapp et al. | 173/12 |

FOREIGN PATENT DOCUMENTS 654823 12/1937 Fed. Rep. of Germany .

*Primary Examiner*—Frank T. Yost
*Assistant Examiner*—Willmon Fridie, Jr.
*Attorney, Agent, or Firm*—Hayes & Reinsmith

[57] ABSTRACT

A positioning device having a chamber having a chamber exhaust valve in a first end and a chamber fluid inlet in a second end; a piston disposed in a chamber between the first end and the second end, the piston being slidable in the valve chamber between a first position toward the first end and a second position toward the second end; the fluid communication opening having a smaller cross-section area than the chamber exhaust valve; and a piston biasing spring urging the piston toward the chamber second end and away from the chamber first end, the piston biasing spring responsive to a fluid pressure differential between the first and second chamber ends above and below a predetermined level to move the piston into the first and second positions, respectively. Also, a power tool having a housing including a fluid supply inlet; a fluid operated motor assembly mounted in the housing, the motor assembly including a motor fluid inlet; a valve connecting the fluid supply inlet and the motor fluid inlet; the valve being operable between a first position permitting fluid communication between the fluid supply inlet and the motor fluid inlet and a second position restricting fluid communication between the fluid supply inlet and the motor fluid inlet; and a positioning device operatively connected to the valve, the positioning device having first and second positions corresponding to the valve first and second positions, respectively.

12 Claims, 5 Drawing Sheets

SOLENOID CONTROLLED AIR TOOL

BACKGROUND OF THE INVENTION

This invention relates generally to a fluid operated power tool and, more particularly, to a fluid control for such a power tool.

Fluid operated power tools have long been employed to set fasteners in a variety of applications. In these fastener setting applications, it is often desirable to control the output of the power tool after the fastener has been set to prevent the tool setting force from exceeding the design limits of the fastener. For example, rotary fluid operated power tools are often utilized to set screws, nuts and other threaded fasteners. For these applications, it is usually desirable to limit the output torque of the tool to meet design specifications of the fastener and workpiece.

Various devices and techniques have been utilized to limit the output of the tool after the fastener has been applied to the workpiece. The simplest method in hand held tools is for the operator to rely on a force output measuring device, for example, a torque indicator, to indicate when the fluid supply to the power tool motor should be shut off.

More sophisticated devices, such as clutch mechanisms, have been employed in rotary power tools to limit output of the tool. Some clutch mechanisms utilize cam and spring or other arrangements to disengage the fluid operated motor from the power output shaft when a predetermined torque load is reached. While these mechanisms have considerable advantages, they are limited in the precision achieved in controlling the maximum torque applied to the fastener because of undesirable kinetic inertial effects of the mechanism. Most such clutches provide a dynamic output disengagement torque which has an undesirable variation from the desired limit.

An improved clutch mechanism was disclosed in U. S. Pat. No. 4,488,604 which eliminated much of the aforementioned inertial effects. This patent disclosed a frictional-contact type clutch in a fluid operated rotary power tool which utilized a latch and pin control unit to shut off the motor when a predetermined output torque, as established at the clutch, was reached. The latch operated within one revolution of relative clutch slippage to release a pin which shuts off the fluid supply to the motor.

Variation in desired set torque can be determined by statistical analysis of repeated measurements to calculate the standard variation from the mean, i.e., the desired set torque. In automotive applications it is common to measure performance by plus-or-minus three times the standard deviation, i.e., the so called "six-sigma" standard. The best six-sigma combined fastening performance of prior art fluid operated rotary power tools under ISO standard 5393 has generally been no better than about plus or minus 20 percent of mean torque.

Bearing in mind these and other deficiencies of the prior art, it is therefore an object of the present invention to provide a fluid operated power tool with improved force disengagement control.

It is also an object of the present invention to provide such a tool with a force disengagement control which reduces variations in fastener setting force in repeated applications.

It is a further object of the present invention to provide such a tool which can be hand held.

It is another object of the present invention to provide a fluid operated power tool which has a rotary output and improved torque disengagement control.

Other objects will be in part obvious and in part pointed out in more detail hereinafter.

A better understanding of the objects, advantages, features, properties and relations of the invention will be obtained from the following detailed description and accompanying drawing which sets forth an illustrative embodiment and is indicative of the way in which the principle of the invention is employed.

SUMMARY OF THE INVENTION

In one aspect, the present invention comprises a positioning device having a chamber with a chamber exhaust valve in a first end and a chamber fluid inlet in a second end; a piston disposed in the chamber between the first end and the second end, the piston being slidable in the valve chamber between a first position toward the first end and a second position toward the second end; fluid communication means between the chamber first and second ends, the fluid communication means having a smaller cross-section area than the chamber exhaust valve; and piston biasing means urging the piston toward the chamber second end and away from the chamber first end, the piston biasing means responsive to a fluid pressure differential between the first and second chamber ends above and below a predetermined level to move the piston into the first and second positions, respectively.

In another aspect, the present invention comprises a power tool having a housing including a fluid supply inlet; a fluid operated motor assembly mounted in the housing, the motor assembly including a motor fluid inlet; valve means connecting the fluid supply inlet and the motor fluid inlet, the valve means being operable between a first position permitting fluid communication between the fluid supply inlet and the motor fluid inlet and a second position restricting fluid communication between the fluid supply inlet and the motor fluid inlet; and the above described positioning device operatively connected to the valve means wherein the positioning device first and second positions correspond to the valve means first and second positions, respectively.

In a further aspect, the present invention comprises a power tool having a housing including a fluid supply inlet and a fluid exhaust; a fluid operated motor assembly mounted in the housing, the motor assembly including a motor fluid inlet; valve means connecting the fluid supply inlet, the motor fluid inlet, and the fluid exhaust; the valve means being operable between a first position permitting fluid communication between the fluid supply inlet and the motor fluid inlet while restricting fluid communication between the motor fluid inlet and the fluid exhaust, and a second position restricting fluid communication between the fluid supply inlet and the motor fluid inlet while permitting fluid communication between the motor fluid inlet and the fluid exhaust, the second position being engageable simultaneously with disengagement of the first position; means for measuring the force output of the motor assembly; and actuating means responsive to the force measuring means for disengaging the valve means first position and engaging the valve means second position when the force output exceeds a predetermined level, the power tool being operable to reduce the peak fluid pressure at the motor fluid inlet, at the time the actuating means is engaged, to no more than 75% of the peak fluid pressure within 10 milliseconds.

DETAILED DESCRIPTION OF THE INVENTION

Figure 1B:
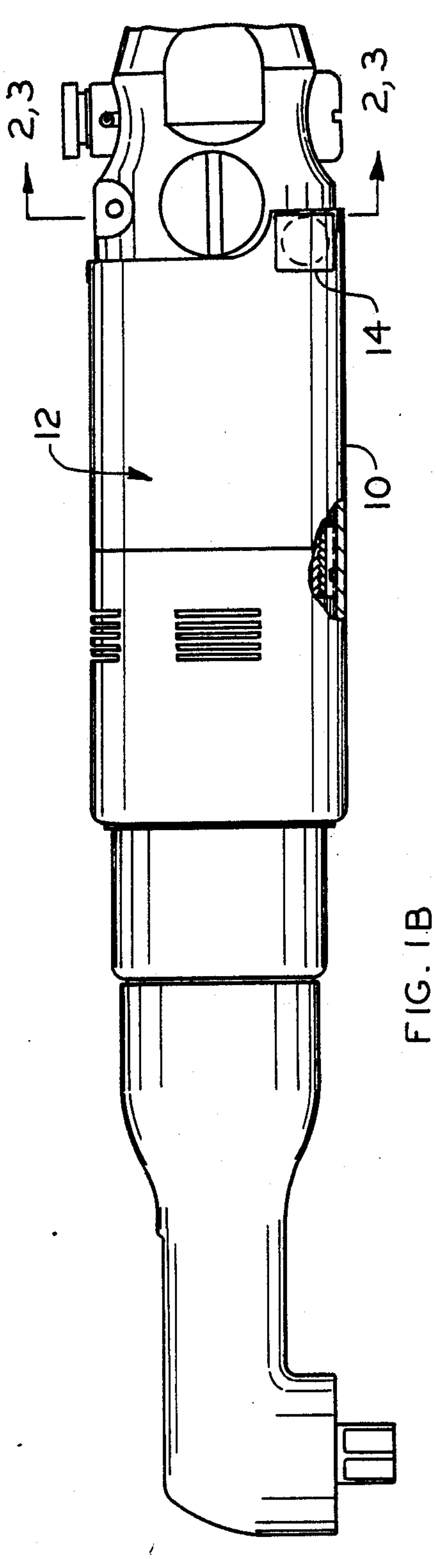
FIGS. 1A and 1B are side views, partially in section, of an embodiment of the power tool of this invention.
Figure 1A:
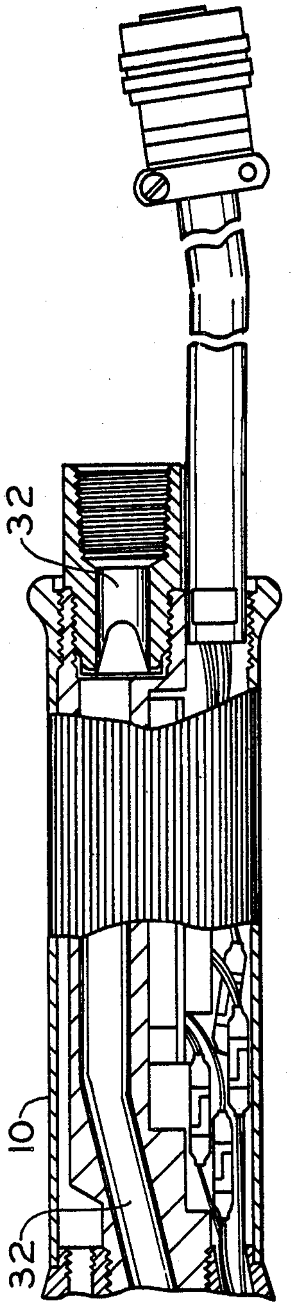

An embodiment of the power tool of the present invention is illustrated in FIGS. 1A, 1B, 2 and 3. Housing 10 is shown with fluid supply inlet 32 and fluid exhaust 38. The fluid operated motor assembly of conventional design is indicated generally as 12 and includes a motor fluid inlet 34. The preferred fluid employed in the present invention is air.

In normal operation fluid supply inlet 32 is connected to a source of fluid at elevated pressure. Fluid exhaust 38 provides fluid communication between the power tool housing 10 and a region at lower pressure than that of the fluid source, usually the atmosphere.

The power tool illustrated is a rotary power tool for use in setting screws, nuts and other threaded fasteners. Motor assembly 12 is connected by a conventional drive assembly (not shown) to a rotary output shaft upon which can be mounted conventional fastener engaging means such as sockets and the like.

A measuring device is employed to measure the force output of the power tool during fastener setting. In the case of a rotary power tool, measurement of output torque is desired. Measurement of the torque output may be by any number of means, for example, strain gauge measurement of shaft twisting or by measurement and correlation of fluid pressure at the fluid-operated motor assembly. In the preferred embodiment of the power tool of the present invention, a transducer 14 as shown in FIGS. 2 and 3 is employed to measure fluid pressure at the motor fluid inlet 34.

The power tool of the present invention utilizes valve means 18 disposed in housing 10 to control the flow of fluid to the motor assembly 12, thereby controlling the power output of the power tool. The valve means 18, when used with a suitable valve positioning device, enables quick and positive shut-off of the fluid supply to the power tool motor once the desired output is attained. In addition, the valve means 18 enables motor fluid back pressure to be exhausted once the desired force output is attained. Preferably, the motor back pressure exhaust occurs simultaneously with the shut-off of fluid supply to the motor. It has been determined that utilization of such valve means in the power tool of the present invention can result in significantly lower variation in the desired set force, e.g., torque, to the fastener over repeated applications.

Valve means 18 connects fluid supply inlet 32, motor fluid inlet 34, and fluid exhaust 38. The valve means 18 is operable between a first and second position, corresponding to In the the power tool "on" and "off" condition, respectively. In the first position, fluid communication is permitted between the fluid supply inlet 32 and the motor fluid inlet 34 while there is restricted, i.e., no, fluid communication between the fluid exhaust 38 and the motor fluid inlet 34. In the second position there is restricted fluid communication between the fluid supply inlet 32 and the motor fluid inlet 34 while there is permitted fluid communication between the motor fluid inlet 34 and the fluid exhaust 38.

Figure 2:
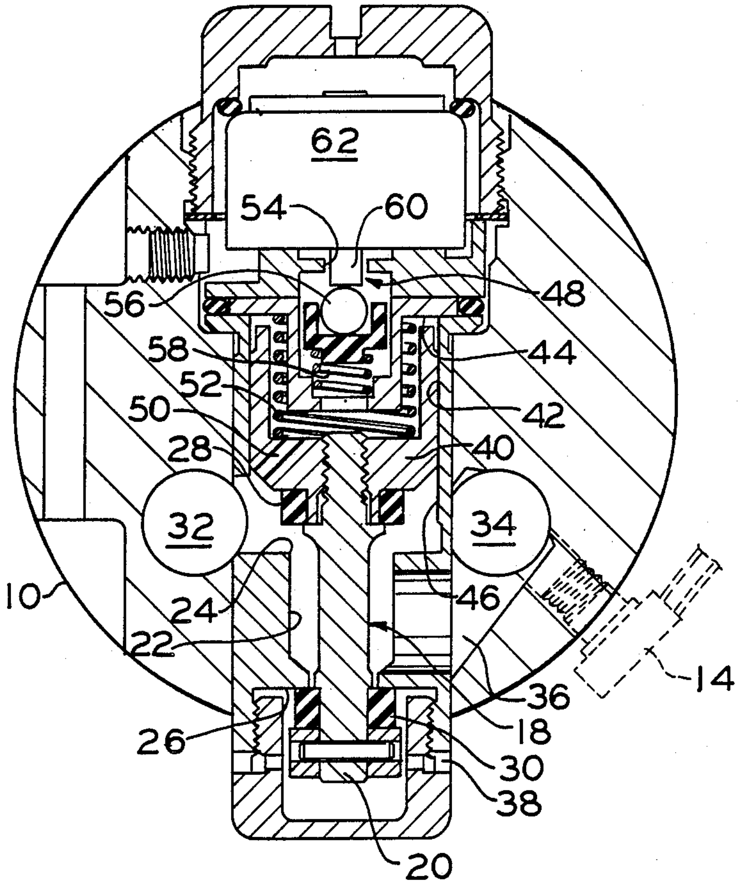
FIG. 2 is a cross-sectional view of a portion of the tool in FIGS. 1A and 1B in the "on" condition.
Figure 3:
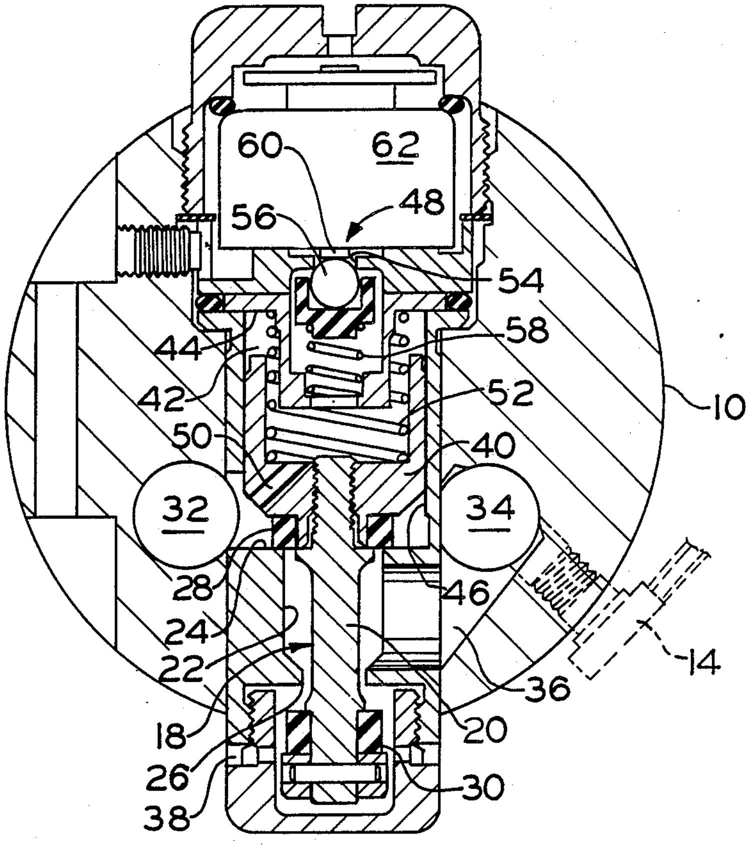
FIG. 3 is the cross-sectional view of FIG. 2 of the tool in the "off" condition.

In the preferred embodiment of the valve means 18 illustrated in cross-section in FIGS. 2 and 3, a valve shaft 20 is linearly slidable in valve sleeve 22. First valve seat 24 and second valve seat 26 are axially spaced at opposite ends of valve sleeve 22. First valve seal 28 and second valve seal 30 are axially spaced at opposite ends of valve shaft 20 and are configured to produce a sealing engagement with first valve seat 24 and second valve seat 26, respectively. In FIG. 2, valve shaft 20 is shown in a first position corresponding to a power tool "on" condition wherein first valve seal 28 is extended from first valve seat 24 and the two are not in sealing engagement. This permits fluid communication between fluid supply inlet 32 and motor fluid inlet 34 through passageway 36. In this valve shaft first position, second valve seal 30 is in sealing engagement with second valve seat 26 and there is no fluid communication between fluid exhaust 38 and motor fluid inlet 34 through passageway 36.

FIG. 3 illustrates the preferred embodiment of valve means 18 in the power tool "off" condition wherein valve shaft 20 has been linearly moved in valve sleeve 22 into a second position. First valve seal 28 is now in sealing engagement with first valve seat 24 and second valve seal 30 is extended from second valve seat 26. There is no fluid communication permitted between motor fluid inlet 34 and fluid supply inlet 32 while there is permitted fluid communication between motor fluid inlet 34 and fluid exhaust 38 through passageway 36.

The valve positioning device which is preferably employed in the power tool of this invention is shown generally in FIGS. 2 and 3. While this positioning device is particularly useful in the power tool of this invention, it may be used in any application which employs a device which is switchable between two positions. A piston 40 is disposed in chamber 42 and is slidable between first chamber end 44 and second chamber end 46. In the configuration illustrated, the piston 40 is linearly slidable between a first position near the chamber first end 44 (shown in FIG. 2) and second position near the chamber second end 46 (shown in FIG. 3).

In the first chamber end 44 there is shown a chamber valve 48 for exhausting fluid from the chamber. A chamber fluid inlet, here shown as fluid supply inlet 32, is connected to chamber second end 46 for supplying fluid to the chamber. Fluid communication means, shown as a hole 50 defined in piston 40 allows fluid communication between the chamber first end 44 and the chamber second end 46. Other fluid communication means may be employed such as providing an annular space between the outer diameter of the piston 40 and the inner diameter of the chamber 42. For reasons that will be made known below, it is essential that the cross-sectional area of the fluid communication means between the chamber ends is less than the cross-sectional area of an opening 54 of the chamber valve 48 between the chamber interior and exterior. It will be understood that the opening 54 communicates to atmosphere through suitable exhaust passages, not shown.

Piston biasing means, shown as spring 52 in the chamber first end 44, urges the piston away from the chamber first end 44 and toward the chamber second end 46. The piston biasing means is chosen so as to be responsive to a fluid pressure differential between the chamber first and second ends. When the difference in pressure between the chamber ends is above a predetermined level, the piston biasing means allows the piston 40 to move into its first position toward the chamber first end 44. Conversely, when the difference in pressure between the chamber ends is below a predetermined level, the piston biasing means moves the piston 40 into its second position toward the chamber second end.

Shaft 20 is connected to piston 40 for transmitting movement of the piston 40 to the power tool valve means 18. When the positioning device is utilized in other applications, for example, as a switch for some other device, the piston 40 movement may be transmitted to that other device by any means known in the art.

In the positioning device of the present invention, chamber valve 48 may comprise any suitable valve design which is operable between an open (fluid communicating) and closed (fluid restricting) position. FIGS. 2 and 3 illustrate the preferred embodiment of the chamber valve employed in the present invention. The chamber first end contains an opening 54 defined in a wall of the chamber. A plug 56, herein shown as a ball, is disposed in the interior of the chamber 42 and is partially receivable in the chamber opening 54 to produce a fluid restricting, preferably fluid-tight, seal. Plug biasing means 58, shown as a spring, is also located in the chamber interior and urges the plug 56 into sealing engagement with opening 54. A slidable plunger 60 is operable to project against plug biasing means 58 to remove plug 56 from opening 54 and open the valve. In the preferred embodiment of this invention the plunger is solenoid operated.

The operation of the valve positioning device is as follows. The chamber fluid inlet is connected to a source of fluid, preferably air. The fluid source is at a pressure higher than that of the chamber exterior at the chamber exhaust valve. Normally, the chamber exterior will be at ambient pressure of approximately one atmosphere.

When the chamber valve 48 is open, as shown in FIG. 2, fluid enters the chamber second end 46 through inlet 32, passes through the piston hole 50, and exhausts from the chamber through the valve 48. Since the cross-sectional area of the piston hole 50 is smaller than that of the chamber valve 48, the pressure in the chamber second end 46 will be greater than the pressure in the chamber first end 44. The pressure differential increases with increasing fluid supply pressure and decreasing piston hole cross-section.

When the pressure differential is above a predetermined value selected in conjunction with the characteristics of spring 52, the piston 40 will be in a first position as shown in FIG. 2. This position will be maintained with a relatively constant fluid supply pressure and corresponds to a power tool "on" condition.

When it is desired to switch the power tool to the "off" condition, the fluid supply pressure is maintained and the chamber valve 48 is closed. After the chamber valve is closed, as shown in FIG. 3, fluid no longer exhausts therethrough from chamber 42. Piston hole 50 allows fluid communication between the initially higher pressure chamber second end 46 and initially lower pressure chamber first end 44, thereby causing a decrease in the pressure differential between the two chamber ends. Eventually, the pressure equalizes between the two chamber ends. When the pressure differential falls below a predetermined value selected in conjunction with the characteristics of spring 52, spring 52 will cause piston 40 to move from its first position and into a second position away from the chamber first end and toward the chamber second end. Shaft 20 transmits piston 40 motion as it moves from its first position to its second position to turn the power tool off.

The above-described positioning device construction provides rapid piston 40 response, and consequently rapid output shaft 20 response, as chamber valve 48 is closed. Since the rate at which chamber valve 48 is closed has an effect on the response rate of piston 40, it is important that a fast closing chamber valve is employed in the aforementioned positioning device.

The illustrated preferred embodiment of chamber valve 48 provides a quick response. A solenoid actuating means 62, which operates plunger 60, provides quick movement of the plunger 60 from the "on" position wherein the plunger is projected and the plug 56 is removed from the opening 54 to the "off" position wherein the plunger is retracted and the plug 56 is urged by plug biasing means 58 into sealing engagement with the chamber opening 54. The location of the plug 56 within the chamber 42 allows the force exerted on the plug 56 by the exhausting fluid to act in conjunction with plug biasing means 58 to move the plug 56 into opening 54. Consequently, the chamber valve 48 closes quickly upon retraction of the solenoid plunger.

A control system (not shown) may be incorporated into a power tool whereby a signal from a force output measuring device, for example, transducer 14, may be used to trigger the solenoid which controls the operation of valve 48. In this manner, the plunger 56 of chamber valve 48 may be made to close once a predetermined force output has been reached, thereby quickly turning the power tool from an "on" to an "off" position. The preferred embodiment of the present invention has been shown to reduce the peak fluid pressure at the motor fluid inlet of the power tool to no more than 75% of that peak fluid pressure within 10 milliseconds after a shut off signal was given to the solenoid.

EXAMPLE

A hand held, rotary output, air powered tool was constructed according to the aforedescribed preferred embodiment and tested to determine the performance of the tool.

Figure 4:
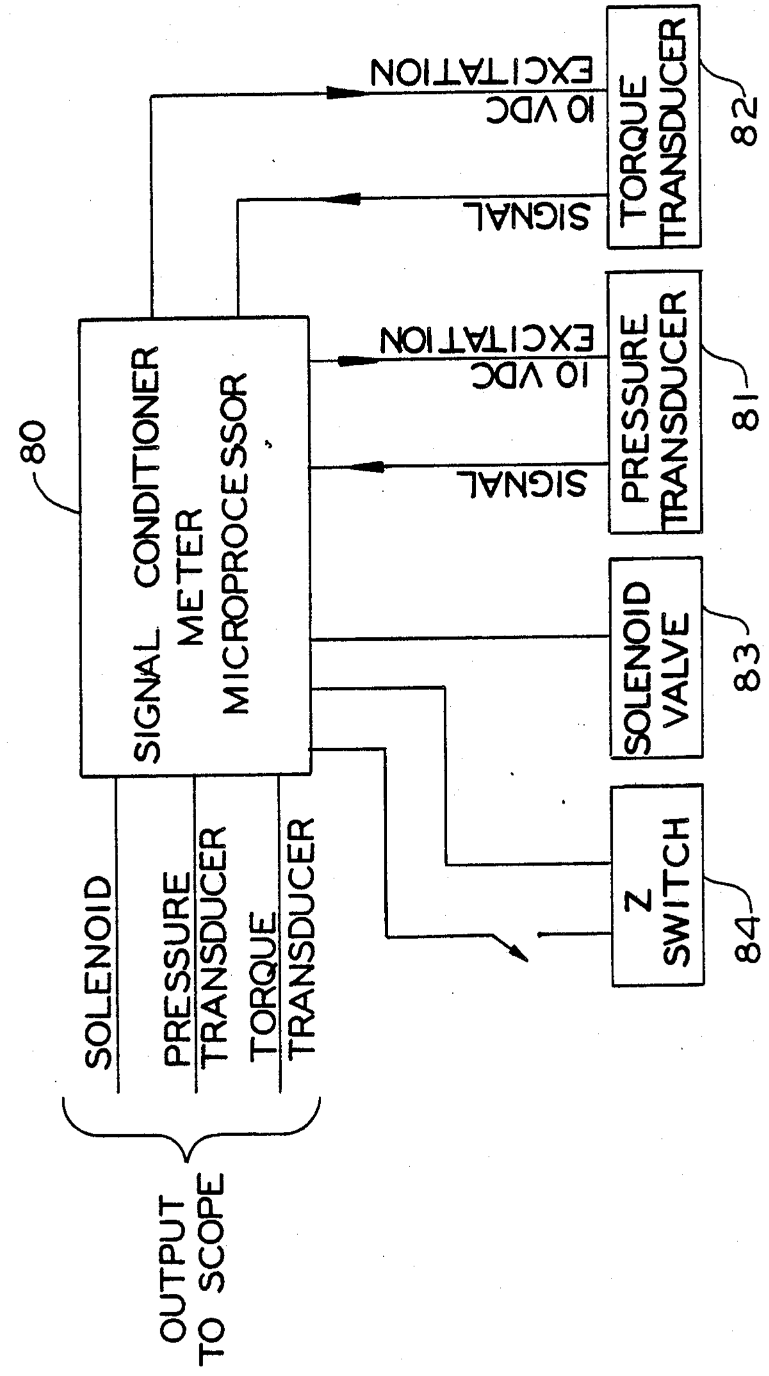
FIG. 4 is a block diagram of a tool control and tool performance measurement configuration.

A schematic of the tool control system is shown in FIG. 4. A processor indicated on the schematic as "signal conditioner meter microprocessor" 80 receives input from the pressure transducer 81 which measures the air pressure at the motor fluid inlet and a torque transducer 82 which measures the actual torque output of the tool. The processor is also connected to the solenoid valve 83 which corresponds to valve means 18 in the aforedescribed preferred emdodiment, and to a "Z switch" 84 which sets the power tool in the running mode. Output from the processor includes output torque ("torque"), motor fluid inlet pressure ("pressure") and solenoid voltage ("solenoid").

The power tool was set to run a fastening job in which the processor was preset to shut off the solenoid valve when the output torque reached 25 foot-lbs.

Figure 5:
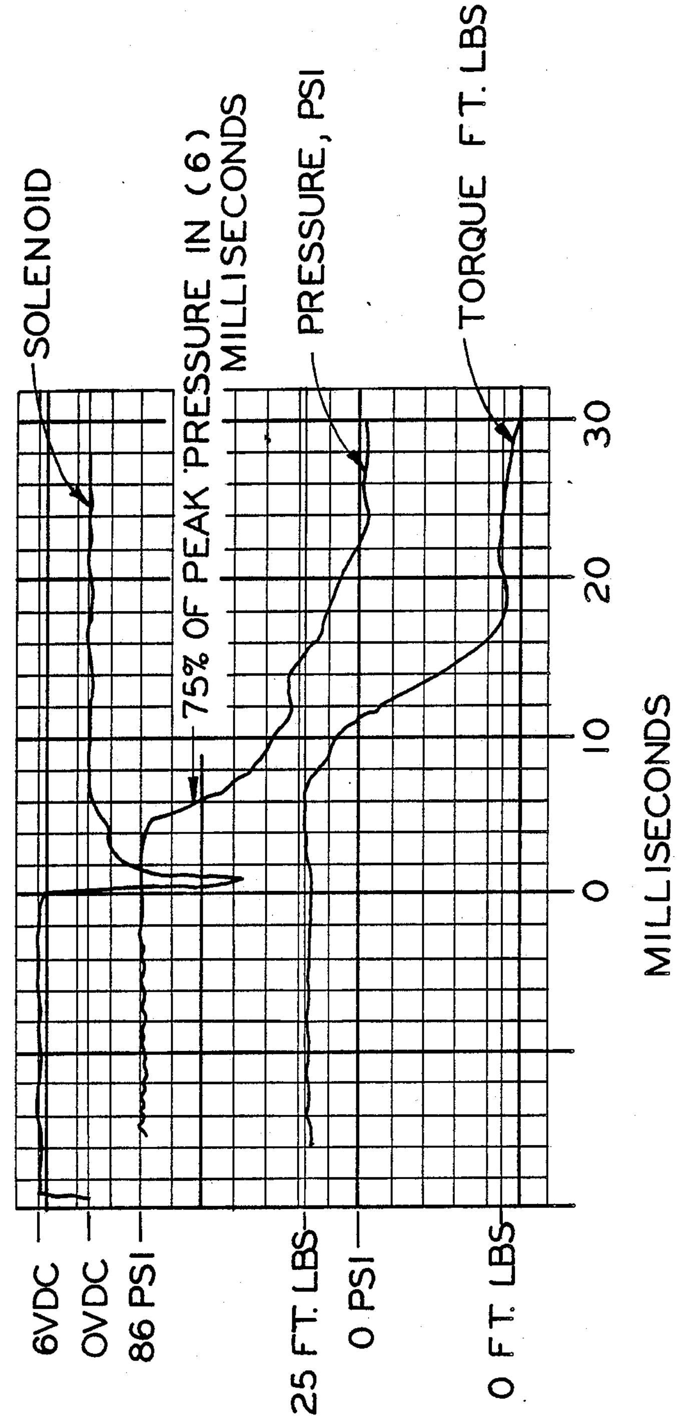
FIG. 5 is a graphical representation of the tool control and output parameters as the tool is switched from an "on" condition to the "off" condition.

FIG. 5 shows the processor overlaid output signals as a function of time in the period just before and after the solenoid valve was shut off. The moment the solenoid valve shut off signal was given is designated as zero. As indicated by the pressure curve, approximately 4.5 milliseconds were necessary for an air pressure drop to occur at the motor fluid inlet. This is approximately the time necessary for the solenoid to deenergize and retract the plunger, the plug to seat in the valve opening, the pressure to equalize on either side of the piston, and the biased piston to shut off air flow from the fluid supply inlet to the motor fluid inlet and open the passageway between the motor fluid inlet and the fluid exhaust. In a further 1.5 milliseconds, the motor fluid inlet pressure was reduced to 75% of the peak pressure. The actual torque output quickly followed the fluid pressure in showing a sharp decrease to about 75% of the peak or operating torque 11 milliseconds after the solenoid valve shut off signal was given.

Further tests of the power tool showed that the present invention resulted in a decrease in the six-sigma scatter in combined high and low torque rate joints (under ISO standard 5393) from over 20% of mean torque to less than 10% of mean torque. In tests of certain high and low torque rate joints, the six-sigma scatter decreased to less than 5% of mean torque.

While this invention has been described with reference to a specific embodiment, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having thus described the invention, what is claimed is:

1. A power tool comprising:

a housing having a fluid supply inlet;

a fluid operated motor assembly mounted in said housing, said motor assembly including a motor fluid inlet;

valve means connecting said fluid supply inlet and said motor fluid inlet, said valve means being operable between a first position permitting fluid communication between said fluid supply inlet and said motor fluid inlet and a second position restricting fluid communication between said fluid supply inlet and said motor fluid inlet; and a positioning device having a chamber including a chamber exhaust valve in a first end and a chamber fluid inlet in a second end; a piston disposed in said chamber between said first end and said second end, said piston being slidable in said valve chamber between a first position toward said first end and a second position toward said second end; fluid communication means between said chamber first and second ends, said fluid communication means having a smaller cross-section area than said chamber exhaust valve; and piston biasing means urging said piston toward said chamber second end and away from said chamber first end, said piston biasing means responsive to a fluid pressure differential between said first and second chamber ends above and below a predetermined level to move said piston into said first and second positions, respectively, said positioning device operatively connected to said valve means wherein said positioning device first and second positions correspond to said valve means first and second positions, respectively.

2. The power tool of claim 1 wherein said positioning device chamber exhaust valve comprises an opening in said chamber first end, a plug in said chamber partially receivable in one side of said opening to produce a seal, plug biasing means in said chamber urging said plug into said opening, and means for removing said plug from said opening against said plug biasing means.

3. The power tool of claim 1 wherein said valve means is further connected to a fluid exhaust in said housing, said valve means in said first position further restricting fluid communication between said motor fluid inlet and said fluid exhaust, said valve means in said second position further permitting fluid communication between said motor fluid inlet and said fluid exhaust.

4. The power tool of claim 3 wherein said valve means includes means for simultaneously engaging said second position upon disengagement of said first position.

5. The power tool of claim 4 further comprising:

A force output measuring device for measuring the force output of said motor assembly and signaling a desired fastener set force; and actuating means responsive to a signal from said force output measuring device for disengaging said valve means first position and engaging said valve means second position when said force output exceeds a predetermined level.

6. The power tool of claim 3 wherein said valve means comprises a valve sleeve having first and second axially spaced valve seats, said first valve seat defining a passageway between said fluid supply inlet and said motor fluid inlet, said second valve seat defining a passageway between said motor fluid inlet and said fluid exhaust; and a valve shaft having first and second valve seals engageable in a sealing relationship with said first and second valve seats, respectively, said valve shaft being movable between said valve means first position wherein said first valve seal is extended from said first valve seat and said second valve seal is engaged with said second valve seat and said valve means second position wherein said first valve seal is engaged with said first valve seat and said second valve seal is extended from said second valve seat.

7. The power tool of claim 6 wherein said fluid supply inlet is connected to said chamber fluid inlet.

8. The power tool of claim 7 further comprising:

A force output measuring device for measuring the force output of said motor assembly and signaling a device fastener set force; and actuating means responsive to a signal from said force output measuring device for closing said chamber valve when said force output exceeds a predetermined level.

9. The power tool of claim 7 wherein said chamber exhaust valve comprises an opening in said chamber first end, a plug in said chamber partially receivable in one side of said opening to produce a seal, plug biasing means in said chamber urging said plug into said opening, and means for removing said plug from said opening against said plug biasing means.

10. The power tool of claim 9 further comprising:

a force output measuring device for measuring the force output of said motor assembly and signaling a device fastener set force; and actuating means responsive to a signal from said force output measuring device and cooperating with said chamber exhaust valve to remove said plug from said opening until said torque output exceeds a predetermined level.

11. The power tool of claim 10 wherein said chamber exhaust valve actuating means, said positioning device, and said valve means are operable to reduce the peak fluid pressure at said motor fluid inlet, at the time said actuating means is engaged, to no more than 75% of said peak fluid pressure within 10 milliseconds.

12. A power tool comprising:

a housing having a fluid supply inlet and a fluid exhaust;

a fluid operated motor assembly mounted in said housing, said motor assembly including a motor fluid inlet;

valve means connecting said fluid supply inlet, said motor fluid inlet, and said fluid exhaust; said valve means being operable between a first position permitting fluid communication between said fluid supply inlet and said motor fluid inlet while restricting fluid communication between said motor fluid inlet and said fluid exhaust, and a second position restricting fluid communication between said fluid supply inlet and said motor fluid inlet while permitting fluid communication between said motor fluid inlet and said fluid exhaust, said second position being engageable simultaneously with disengagement of said first position;

a force output measuring device for measuring the force output of said motor assembly and signaling a desired fastener set force; and actuating means responsive to a signal from said force output measuring device for disengaging said valve means first position and engaging said valve means second position when said force output exceeds a predetermined level, said power tool being operable to reduce the peak fluid pressure at said motor fluid inlet, at the time said actuating means is engaged, to no more than 75% of said peak fluid pressure within 10 milliseconds.

* * * * *